United States Patent
Kamado (10) Patent No.: US 9,528,247 B1
(45) Date of Patent: Dec. 27, 2016

(54) CONTROL SYSTEM FOR WORK VEHICLE, CONTROL METHOD, AND WORK VEHICLE

(71) Applicant: KOMATSU LTD., Tokyo (JP)

(72) Inventor: Mitsuhiko Kamado, Hirakata (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 15/037,425

(22) PCT Filed: Nov. 2, 2015

(86) PCT No.: PCT/JP2015/080909
§ 371 (c)(1),
(2) Date: May 18, 2016

(87) PCT Pub. No.: WO2016/039490
PCT Pub. Date: Mar. 17, 2016

(51) Int. Cl.
*G06F 7/70* (2006.01)
*E02F 9/20* (2006.01)
(Continued)

(52) U.S. Cl.
CPC ........... *E02F 9/2095* (2013.01); *E02F 9/0841* (2013.01); *E02F 9/0866* (2013.01); *E02F 9/2075* (2013.01);
(Continued)

(58) Field of Classification Search
CPC ...... E02F 9/2075; E02F 9/2203; E02F 9/2228; E02F 9/2246; E02F 9/2282; E02F 9/2285; E02F 9/2292
See application file for complete search history.

(56) References Cited

U.S. PATENT DOCUMENTS 7,219,769 B2 * 5/2007 Yamanouchi ......... B66F 9/0755
187/222
2009/0013810 A1 * 1/2009 Nakagawa ............. B60W 10/02
74/335
(Continued)

FOREIGN PATENT DOCUMENTS

CN      1526045 A      9/2004
CN      101878385 A    11/2010
(Continued)

OTHER PUBLICATIONS

The International Search Report for the corresponding international application No. PCT/JP2015/080909, issued on Dec. 8, 2015.
(Continued)

*Primary Examiner* — Redhwan K Mawari
(74) *Attorney, Agent, or Firm* — Global IP Counselors, LLP (57) ABSTRACT

A control system for a work vehicle includes a temperature detecting unit and a controller. The temperature detecting unit detects the temperature of the electrical drive system. The controller controls the output of an electric motor when the temperature of the electrical drive system detected by the temperature detecting unit exceeds a predetermined first threshold and an operating member of the movable body is positioned in a neutral position. The controller does not limit the output of the electric motor when the operating member for the movable body is being operated even when the temperature of the electrical drive system exceeds the first threshold.

19 Claims, 8 Drawing Sheets

(51) Int. Cl.
*E02F 9/08* (2006.01)
*E02F 9/22* (2006.01)
*H02P 29/00* (2016.01)
*H02K 9/04* (2006.01)
*E02F 3/32* (2006.01)

(52) U.S. Cl.
CPC ............. *E02F 9/226* (2013.01); *E02F 9/2235* (2013.01); *H02K 9/04* (2013.01); *H02P 29/0044* (2013.01); *B60Y 2200/412* (2013.01); *E02F 3/32* (2013.01); *Y10S 903/903* (2013.01)

(56) References Cited

U.S. PATENT DOCUMENTS

| | | | | |
|---|---|---|---|---|
| 2009/0048747 A1* | 2/2009 | Stridsberg | ............. | B60K 6/387 701/55 |
| 2010/0043419 A1* | 2/2010 | Nomura | ................. | B60K 17/10 60/328 |
| 2012/0093624 A1* | 4/2012 | Ohhigashi | ............. | E02F 9/2203 414/722 |
| 2012/0177470 A1* | 7/2012 | Ohhigashi | ............. | E02F 9/2075 414/687 |
| 2012/0186889 A1* | 7/2012 | Yoshida | ................. | E02F 3/325 180/65.265 |
| 2015/0159613 A1* | 6/2015 | Jensen | ................. | B60W 10/02 701/68 |
| 2016/0222631 A1* | 8/2016 | Kohno | ................. | E02F 9/0866 |

FOREIGN PATENT DOCUMENTS

| | | | | | |
|---|---|---|---|---|---|
| CN | 102092549 | A | | 6/2011 | |
| JP | 2008-507677 | A | | 3/2008 | |
| JP | 20090013810 | A | * | 2/2009 | .......... B60C 23/061 |
| JP | 2009-52339 | A | | 3/2009 | |
| JP | 2010-285828 | A | | 12/2010 | |
| JP | 5044727 | B2 | | 10/2012 | |
| KR | 20120093624 | A | * | 8/2012 | |
| WO | 2015133584 | A1 | | 9/2015 | |

OTHER PUBLICATIONS

The Office Action for the corresponding Chinese application No. 201580002509.2, dated Aug. 5, 2016.

* cited by examiner

| | FIRST STATE | SECOND STATE | THIRD STATE | FOURTH STATE | FIFTH STATE | SIXTH STATE |
|---|---|---|---|---|---|---|
| CONTROL MODE | SECOND CONTROL MODE | SECOND CONTROL MODE | FIRST CONTROL MODE | FIRST CONTROL MODE | FIRST CONTROL MODE | SECOND CONTROL MODE |
| OPERATING STATE | IN OPERATION | IN OPERATION | NEUTRAL | IN OPERATION | IN OPERATION | NEUTRAL |
| HB TEMPERATURE | T1 OR LESS | OVER T1 | OVER T1 | OVER T1 | UNDER T0 | UNDER T0 |
| DERATE REQUEST | NO | REQUEST 1 | REQUEST 1 | REQUEST 1 | NO | NO |
| DERATE STATE | NO | NO | IMPLEMENT | IMPLEMENT | IMPLEMENT | NO |
| FAN ROTATION | AUTO | MAX | MAX | MAX | MAX | AUTO |

CONTROL SYSTEM FOR WORK VEHICLE, CONTROL METHOD, AND WORK VEHICLE

CROSS-REFERENCE TO RELATED APPLICATIONS

This application is a U.S. National stage application of International Application No. PCT/JP2015/080909, filed on Nov. 2, 2015.

BACKGROUND

Field of the Invention

The present invention relates to a control system for a work vehicle, a control method, and a work vehicle.

Background Information

A work vehicle includes a movable body, such as a revolving body. For example, the work vehicle in Japanese Laid-open Patent No. 2010-285828 is equipped with a hydraulic pump and a hydraulic motor. The revolving body of the work vehicle of Japanese Laid-open Patent No. 2010-285828 is turned by driving the hydraulic motor using hydraulic fluid discharged from the hydraulic pump.

However, hybrid-type work vehicles have recently been developed which are equipped with an electric motor instead of the hydraulic motor as in Japanese Patent No. 5044727. The revolving body is turned using an electric motor in the hybrid-type work vehicle. The electric motor is driven, for example, using electrical power stored in an electrical power storage device.

SUMMARY

There is a concern in the hybrid-type work vehicle that when the output of the electric motor increases, the temperature of the electrical drive system including the electric motor may rise and overheat. However, work cannot be continued if the electric motor is shut down when the output of the electric motor becomes large.

An object of the present invention is to allow for continuous work while suppressing overheating of the electrical drive system in a work vehicle.

A first aspect is a control system for a work vehicle including a movable body and an electrical drive system including an electric motor for actuating the movable body. The control system comprises a temperature detecting unit and a controller. The temperature detecting unit detects the temperature of the electrical drive system. The controller limits the output of the electric motor when the temperature of the electrical drive system detected by the temperature detecting unit exceeds a predetermined first threshold and an operating member for the movable body is positioned in a neutral position. The controller does not limit the output of the electric motor when the operating member for the movable body is being operated even when the temperature of the electrical drive system exceeds the first threshold.

The output of the electric motor is limited when the temperature of the electrical drive system rises and exceeds the first threshold in the control system according to the present aspect. As a result, a rise in the temperature of the electrical drive system can be suppressed and the generation of overheating can be suppressed. Moreover, the output of the electric motor is limited without completely stopping the electric motor. As a result, while the speed of the movable body is suppressed, work can be continued.

The output of the electric motor is not limited when the operating unit of the movable body is operated. As a result, changes in the behavior of the movable body are suppressed while the operating member is being operated. As a result, a feeling of unease of the operator while operating the operating member can be suppressed.

The controller may limit the output of the electric motor regardless of the position of the operating member for the movable body when the temperature of the electrical drive system exceeds a second threshold that is higher than the first threshold. In this case, a rise in the temperature of the electrical drive system can be promptly suppressed and the generation of overheating can be suppressed.

The controller may release the limitation of the output of the electric motor when the temperature of the electrical drive system falls below a release threshold lower than the first threshold during the limitation of the output of the electric motor. In this case, the speed of the movable body can be allowed to recover when the concern of overheating decreases.

The controller may continue the limitation of the output of the electric motor when the operating member for the movable body is being operated even when the temperature of the electrical drive system falls below the release threshold during the limitation of the output of the electric motor. The controller may release the limitation of the output of the electric motor when the temperature of the electrical drive system falls below the release threshold and the operating member for the movable body is positioned in the neutral position during the limitation of the output of the electric motor. In this case, changes in the behavior of the movable body are suppressed while the operating member is being operated. As a result, a feeling of unease of the operator while operating the operating member can be suppressed.

The controller may increase the output of a cooling fan for cooling the electrical drive system when the temperature of the electrical drive system exceeds the first threshold. In this case, the generation of overheating can be suppressed by increasing the cooling capacity of the electrical drive system with the cooling fan.

The controller may be able to switch a control mode of the electric motor between at least a first control mode and a second control mode. The controller may limit the output of the electric motor to a smaller degree than the output corresponding to an operation amount of the operating member for the movable body in the first control mode. The controller may control the output of the electric motor in accordance with an operation amount of the operating member for the movable body in the second control mode. The controller may switch the control mode of the electric motor from the second control mode to the first control mode when the temperature of the electrical drive system exceeds the first threshold while executing the second control mode.

In this case, the movable body is actuated at a higher output in the second control mode. Moreover, the output of the electric motor can be limited by switching the control mode to the first control mode when the temperature of the electrical drive system exceeds the first threshold while executing the second control mode. As a result, the generation of overheating can be suppressed.

The work vehicle may include a hydraulic pump and a work implement driven by hydraulic fluid discharged from the hydraulic pump. The controller may limit the output of the electric motor in accordance with a discharge pressure of the hydraulic pump in the first control mode. In this case, an operation feeling that is the same as one in a work vehicle in which the movable body is driven with hydraulic pressure can be obtained in the first control mode. Moreover, the output of the electric motor can be limited in the first control mode in comparison to the second control mode.

The temperature detecting unit may detect the temperature of the electric motor.

The electrical drive system may include an electrical power control device connected to the electric motor. The temperature detecting unit may detect the temperature of the electrical power control device.

A second aspect is a control method for a work vehicle including a movable body and an electrical drive system including an electric motor for actuating the movable body. The control method comprises first to third steps. In the first step, a signal indicating the temperature of the electrical drive system is received. In the second step, a determination is made as to whether the temperature of the electrical drive system detected by a temperature detecting unit is higher than a predetermined first threshold. In the third step, a command signal is outputted to the electric motor so as to limit the output of the electric motor when the temperature of the electrical drive system detected by the temperature detecting unit exceeds the predetermined first threshold and an operation instruction of the movable body is not received. In the third step, the output of the electric motor is not performed when the operation instruction of the movable body is received even when the temperature of the electrical drive system exceeds the first threshold.

The output of the electric motor is limited when the temperature of the electrical drive system rises and exceeds the first threshold in the control method according to the present aspect. As a result, a rise in the temperature of the electrical drive system can be suppressed and the generation of overheating can be suppressed. Moreover, the output of the electric motor is limited without completely stopping the electric motor. As a result, while the speed of the movable body is suppressed, work can be continued. When an operation instruction of the movable body is received, the output of the electric motor is not limited. As a result, changes in the behavior of the movable body are suppressed while the operating member is being operated. As a result, a feeling of unease of the operator while operating the operating member can be suppressed.

A third aspect is a work vehicle. The work vehicle comprises a movable body and an electrical drive system. The electrical drive system includes an electric motor for actuating the movable body. A temperature detecting unit detects the temperature of the electrical drive system. The output of the electric motor is limited when the temperature of the electrical drive system detected by the temperature detecting unit exceeds a predetermined first threshold and an operating member for the movable body is positioned in a neutral position. The limitation of the output of the electric motor is not performed when the operating unit of the movable body is being operated even when the temperature of the electrical drive system exceeds the first threshold.

The output of the electric motor is limited when the temperature of the electrical drive system rises and becomes equal to or greater than the predetermined first threshold in the work vehicle according to the present aspect. As a result, a rise in the temperature of the electrical drive system can be suppressed and the generation of overheating can be suppressed. Moreover, the output of the electric motor is limited without completely stopping the electric motor. As a result, while the speed of the movable body is suppressed, work can be continued. Moreover, when the operating unit of the movable body is operated, the output of the electric motor is not limited. As a result, changes in the behavior of the movable body are suppressed while the operating member is being operated. As a result, a feeling of unease of the operator while operating the operating member can be suppressed.

The electrical drive system may include an electrical power storage device and an electrical power control device. The electrical power storage device may store electrical power regenerated by the electric motor. The electrical power control device may be connected to the electric motor and the electrical power storage device. In this case, the speed of the movable body is reduced by limiting the output of the electric motor when the temperature of the electrical drive system exceeds the predetermined first threshold. By reducing the speed of the movable body, electrical power regenerated by the electric motor can be suppressed. As a result, the generation of overheating due to an excessive amount of the regenerated electrical power is suppressed.

According to the present invention, continuous work is enabled while limiting overheating of the electrical drive system in a work vehicle.

DETAILED DESCRIPTION OF EXEMPLARY EMBODIMENTS

Figure 1:
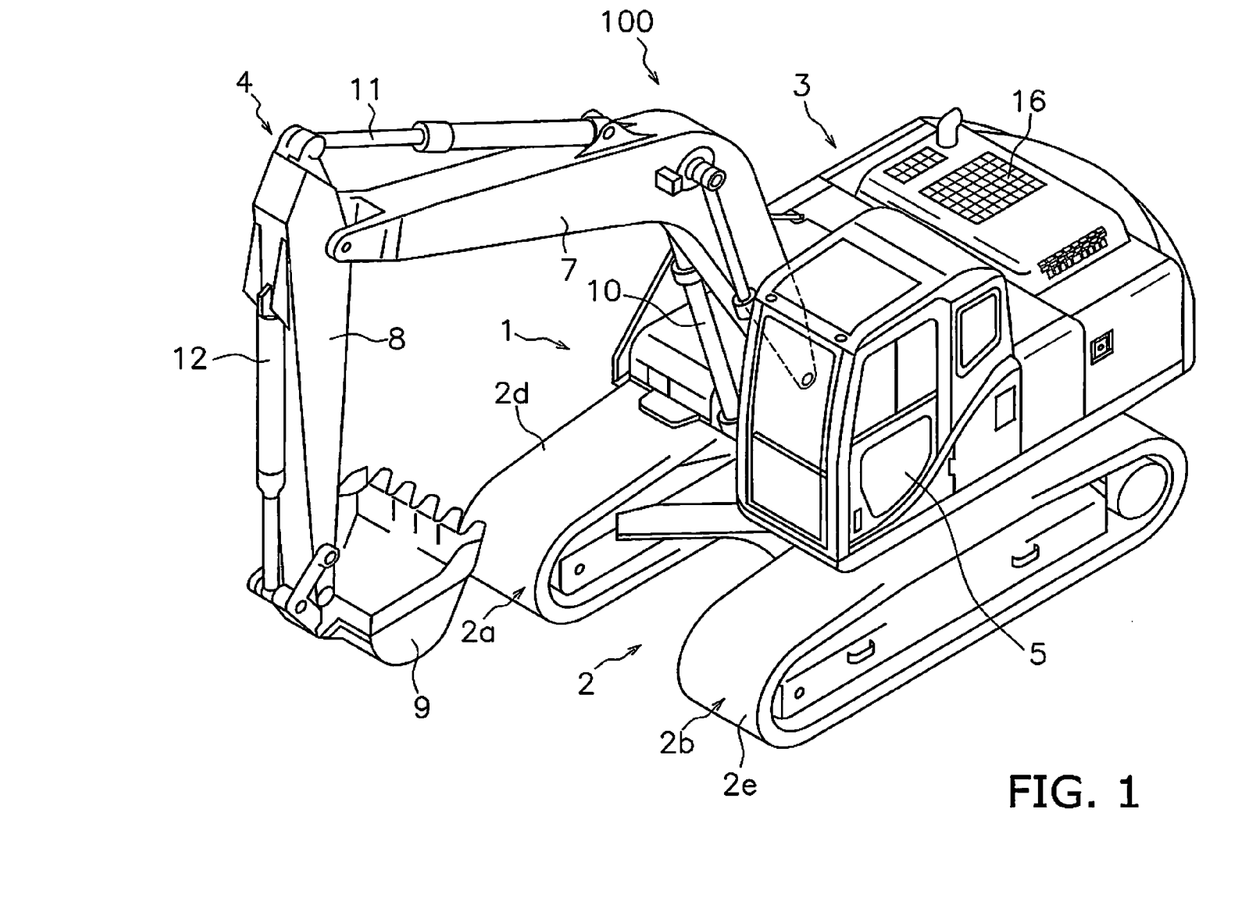
FIG. 1 is a perspective view of a work vehicle according to an exemplary embodiment.

The following is a description of a work vehicle according to the present exemplary embodiment with reference to the drawings. FIG. 1 is a perspective view of a work vehicle 100 according to an exemplary embodiment. The work vehicle 100 is a hydraulic excavator according to the present exemplary embodiment. The work vehicle 100 is provided with a vehicle body 1 and a work implement 4.

The vehicle body 1 includes a traveling body 2 and a revolving body 3. The traveling body 2 includes a pair of travel devices 2a and 2b. The travel devices 2a and 2b respectively include crawler belts 2d and 2e. The travel devices 2a and 2b drive the crawler belts 2d and 2e enabling the work vehicle 100 to travel.

The revolving body 3 is mounted on the traveling body 2. The revolving body 3 is provided in a rotatable manner with respect to the traveling body 2. The revolving body 3 turns by being driven by a below-mentioned revolving electric motor 32 (see FIG. 2). A cab 5 is provided in the revolving body 3. The revolving body 3 includes an engine room 16. The engine room 16 is disposed behind the cab 5. The engine room 16 houses equipment, such as a below-mentioned engine 21 and a hydraulic pump 25.

The work implement 4 is attached to the revolving body 3. The work implement 4 includes a boom 7, an arm 8, a work attachment 9, a boom cylinder 10, an arm cylinder 11, and an attachment cylinder 12. The proximal end of the boom 7 is coupled to the revolving body 3 in a rotatable manner. The distal end of the boom 7 is coupled in a rotatable manner to the proximal end of the arm 8. The distal end of the arm 8 is coupled in a rotatable manner to the work attachment 9.

The boom cylinder 10, the arm cylinder 11, and the attachment cylinder 12 are hydraulic actuators driven by hydraulic fluid discharged from the below-mentioned hydraulic pump 25. The boom cylinder 10 actuates the boom 7. The arm cylinder 11 actuates the arm 8. The attachment cylinder 12 actuates the work attachment 9. The driving of the cylinders 10, 11, and 12 drives the work implement 4. While the work attachment 9 in the present exemplary embodiment is a bucket, the work attachment 9 may also be another attachment, such as a crusher or a breaker.

Figure 2:
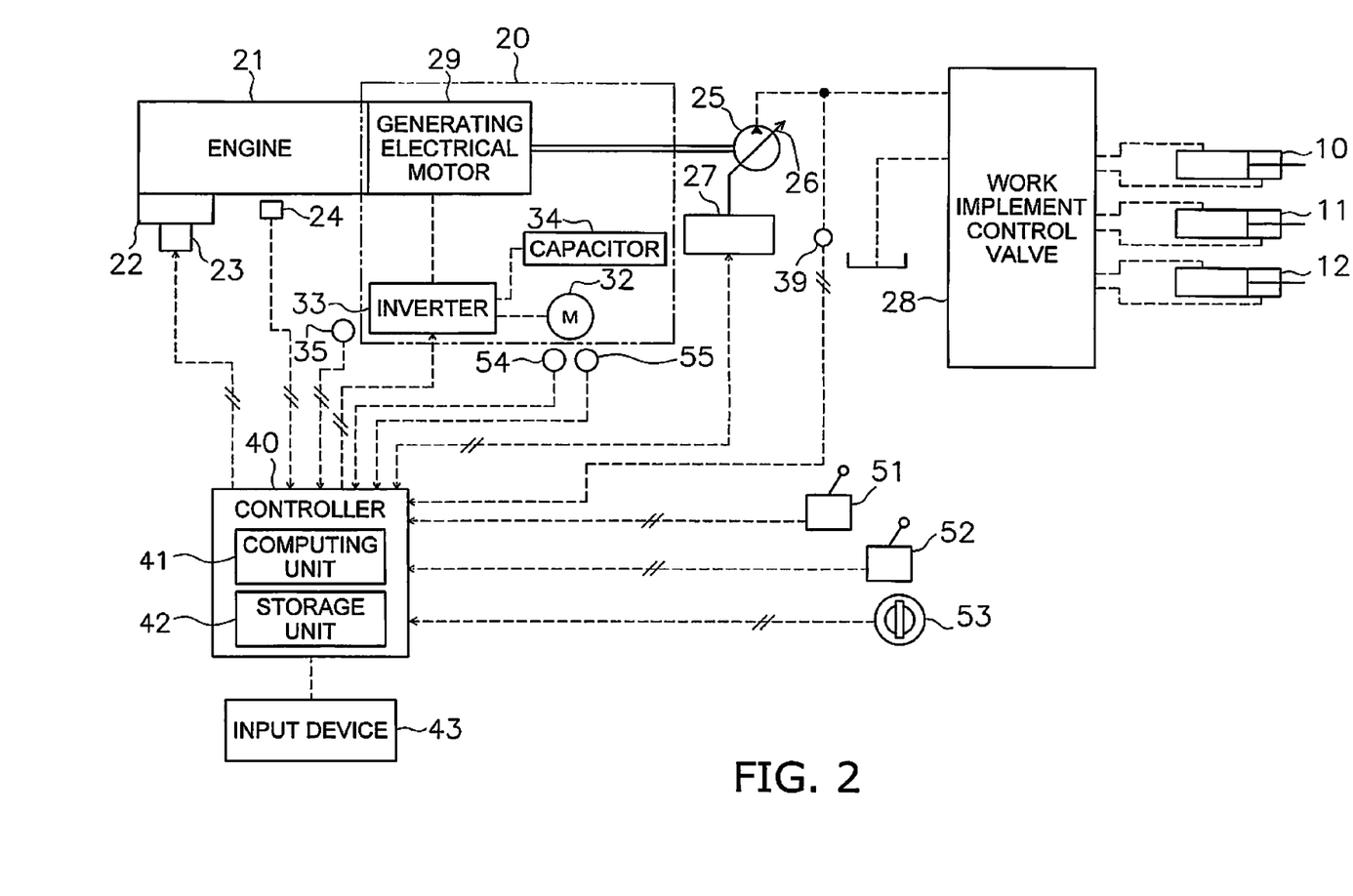
FIG. 2 is a schematic view of an outline configuration of the work vehicle.

FIG. 2 is a schematic view of a configuration outline of the work vehicle 100. The engine 21 is, for example, a diesel engine. The output of the engine 21 is controlled by adjusting the amount of fuel injected into the cylinders of the engine 21. The adjustment is performed by controlling an electronic governor 23 attached to a fuel injection pump 22 with command signals from a controller 40. Generally, an all-speed control system governor is used as the governor 23 so that the engine rotation speed and the fuel injection amount are adjusted according to a load so as to achieve a below-mentioned target rotation speed. That is, the governor 23 increases and decreases the fuel injection amount so as to eliminate a deviation between the target rotation speed and the actual engine rotation speed.

The actual rotation speed of the engine 21 is detected by an engine rotation speed sensor 24. The engine rotation speed detected by the engine rotation speed sensor 24 is inputted into the below-mentioned controller 40 as a detection signal.

A drive shaft of the hydraulic pump 25 is coupled to an output shaft of the engine 21. The hydraulic pump 25 is driven by the rotation of the output shaft of the engine 21. The hydraulic pump 25 is a variable displacement hydraulic pump. The displacement of the hydraulic pump 25 is changed by changing the tilt angle of a swash plate 26.

A pump control valve 27 operates according to a command signal inputted from the controller 40 and controls the hydraulic pump 25 through a servo piston. The pump control valve 27 controls the tilt angle of the swash plate 26 so that the product of the discharge pressure of the hydraulic pump 25 and the displacement of the hydraulic pump 25 does not exceed a pump absorption torque corresponding to a command value (command current value) of a command signal inputted into the pump control valve 27 from the controller 40. That is, the pump control valve 27 controls the output torque of the hydraulic pump 25 in response to the inputted command current value.

The hydraulic fluid discharged from the hydraulic pump 25 is supplied to the hydraulic actuators 10 to 12 through a work implement control valve 28. Specifically, the hydraulic fluid is supplied to the boom cylinder 10, the arm cylinder, 11, and the attachment cylinder 12. As a result, the boom cylinder 10, the arm cylinder 11, and the attachment cylinder 12 are each driven to actuate the respective boom 7, the arm 8, and the work attachment 9.

The discharge pressure of the hydraulic pump 25 is detected by a discharge pressure detecting unit 39. The discharge pressure of the hydraulic pump 25 detected by the discharge pressure detecting unit 39 is inputted into the controller 40 as a detection signal.

The work implement control valve 28 is a directional flow control valve including a plurality of control valves corresponding to the respective hydraulic actuators 10 to 12. The work implement control valve 28 controls the flow rate of the hydraulic fluid supplied to the hydraulic actuators 10 to 12.

The work vehicle 100 is provided with an electrical drive system 20. The electrical drive system 20 includes an electric power generating motor 29, an electrical power control device 33, a revolving electric motor 32, and an electrical power storage device 34.

The electric power generating motor 29 is coupled to the output shaft of the engine 21. The electric power generating motor 29 carries out an electrical power generation action and an electrical driving action. The electric power generating motor 29 is connected to the revolving electric motor 32 and the electrical power storage device 34 through the electrical power control device 33. Electrical power is stored in the electrical power storage device 34 due to the electrical power generation action of the electric power generating motor 29.

The electrical power storage device 34 supplies electrical power to the revolving electric motor 32. The electrical power storage device 34 supplies electrical power to the electric power generating motor 29 when the electric power generating motor 29 is carrying out the electrical driving action. The revolving electric motor 32 is driven by electrical power supplied from the electrical power storage device 34 to turn the above-mentioned revolving body 3. The electrical power storage device 34 in the present exemplary embodiment is a capacitor. A battery or other electricity storage means may be used in place of the capacitor.

Torque of the electric power generating motor 29 is controlled by the controller 40. When the electric power generating motor 29 is controlled so as to carry out the electrical power generation action, a portion of the output torque generated in the engine 21 is transferred to the drive shaft of the electric power generating motor 29 and the torque of the engine 21 is absorbed to generate electricity.

Alternating current electrical power generated in the electric power generating motor 29 is converted to direct current electrical power in the electrical power control device 33 and stored in the electrical power storage device 34. When the electric power generating motor 29 is controlled so as to carry out the electrical driving action, the direct current electrical power stored in the electrical power storage device 34 is converted to alternating current electrical power in the electrical power control device 33 and supplied to the electric power generating motor 29.

As a result, the drive shaft of the electric power generating motor 29 is rotated and torque is generated in the electric power generating motor 29. The torque is transferred from the drive shaft of the electric power generating motor 29 to the output shaft of the engine 21 and added to the output torque of the engine 21. The electrical power generation amount (absorption torque amount) and the electrical power amount (assistance amount, torque generation amount) of the electric power generating motor 29 are controlled in response to command signals from the controller 40.

The electrical power control device 33 converts the electrical power generated when the electric power generating motor 29 is carrying out the electrical power generation action, or the electrical power stored in the electrical power storage device 34, to electrical power having a desired voltage, frequency, and number of phases suited to the revolving electric motor 32, and supplies the electrical power to the revolving electric motor 32. When the turning action of the revolving body 3 is decelerating or braking, the kinetic energy of the revolving body 3 is converted to electrical energy by the revolving electric motor 32. The electrical energy is either stored in the electrical power storage device 34 as regenerated electrical power or is supplied as electrical power for the electrical driving action of the electric power generating motor 29.

The electrical power control device 33 according to the present exemplary embodiment is an inverter. However, the electrical power control device 33 may be a device other than an inverter.

Operating devices 51 to 53 and an input device 43 are provided in the cab 5. The operating members 51 to 53 include a first operating device 51, a second operating device 52, and a target rotation speed setting device 53.

The first operating member 51 is operated by an operator for actuating the revolving body 3. The first operating member 51 includes an operating member, such as a lever and the like. Operation signals indicating an operating direction and an operation amount of the first operating member 51 are inputted into the controller 40. That is, revolving operation signals indicating a right turning operation amount or a left turning operation amount are inputted into the controller 40 in response to the operation amount and the operating direction with respect to the neutral position of the first operating member 51.

The controller 40 controls the electrical power supplied from the electrical power storage device 34 to the revolving electric motor 32 in response to the operation amount of the first operating member 51. As a result, the revolving body 3 turns at a speed in accordance with the operation amount of the first operating member 51. Moreover, the revolving body 3 turns in a direction in accordance with the operating direction of the first operating member 51.

The first operating member 51 may be used in combination as the operating member of the arm 8 in accordance with the operating direction. For example, left-right direction operations of the first operating member 51 may be assigned to the operation of the arm 8 and front-back direction operations may be assigned to the operation of the revolving body 3. In this case, the above-mentioned work implement control valve 28 changes the opening area of the control valve for controlling the arm cylinder 11 in response to the operation amount of the first operating member 51. As a result, the arm 8 operates at a speed in accordance with the operation amount of the first operating member 51. The arm cylinder 11 extends and contracts in accordance with the operating direction of the first operating member 51.

The second operating member 52 is operated by an operator for actuating the boom 7. The second operating member 52 includes an operating member, such as a lever and the like. Operation signals indicating an operating direction and an operation amount of the second operating member 52 are inputted into the controller 40. That is, boom operation signals which indicate a boom raising operation amount and a boom lowering operation amount are inputted into the controller 40 in response to the operation amount and the operating direction with respect to the neutral position of the second operating member 52.

The work implement control valve 28 changes the opening area of a control valve for controlling the boom cylinder 10 in response to the operation amount of the second operating member 52. As a result, the boom 7 operates at a speed in accordance with the operation amount of the second operating member 52. The boom cylinder 10 extends and contracts in accordance with the operating direction of the second operating member 52.

The second operating member 52 may be used in combination as an operating member of the work attachment 9 in response to the operating direction. For example, operation of the second operating member 52 in the left-right direction may be assigned to the operation of the boom 7, and operation of the second operating member 52 in the front-back direction may be assigned to the operation of the work attachment 9. In this case, the work implement control valve 28 changes the opening area of a control valve for controlling the attachment cylinder 12 in response to the operation amount of the second operating member 52. As a result, the work attachment 9 operates at a speed in accordance with the operation amount of the second operating member 52. The attachment cylinder 12 extends and contracts in accordance with the operating direction of the second operating member 52.

The target rotation speed setting device 53 is a device for setting a target rotation speed of the engine 21. The target rotation speed setting device 53 includes an operating member, such as a dial and the like. The operator is able to manually set a target rotation speed of the engine 21 by operating the target rotation speed setting device 53. The contents of the operation of the target rotation speed setting device 53 are inputted into the controller 40 as operation signals.

The input device 43 functions as a display device for displaying information of the work vehicle 100, such as the engine rotation speed. Further, the input device 43 includes a touch-panel monitor and functions as an input device operated by the operator. The contents of the operation of the input device 43 are inputted into the controller 40 as operation signals.

The controller 40 is realized by a computer including a storage unit 42, such as a RAM or a ROM and the like, and a computing unit 41, such as a CPU and the like. The controller 40 is programmed to control the engine 21 and the hydraulic pump 25. The controller 40 may be realized by a plurality of computers.

Figure 3:
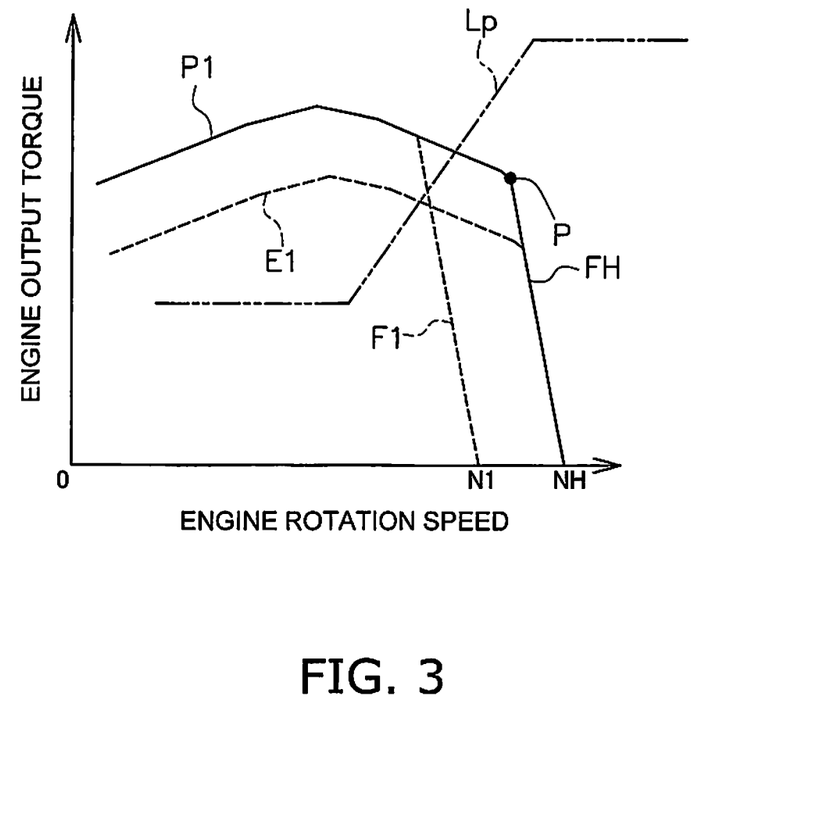
FIG. 3 illustrates an engine output torque line and a pump absorption torque line.

The controller 40 controls the engine 21 on the basis of an engine output torque line, such as the line E1 or P1 in FIG. 3. The engine output torque line represents a torque upper limit value that the engine 21 can output in response to the rotation speed. That is, the engine output torque line defines the relationship between the engine rotation speed and the maximum value of the output torque of the engine 21. The governor 23 controls the output of the engine 21 so that the output torque of the engine 21 does not exceed the engine output torque line. The engine output torque line is stored in the storage unit 42 of the controller 40.

The controller 40 sends a command signal to the governor 23 so that the engine rotation speed conforms to the set target rotation speed. The line FH in FIG. 3 represents a maximum speed regulation line when the target rotation speed is a maximum target rotation speed NH. The line F1 in FIG. 3 represents a regulation line when the target rotation speed is N1 which is less than NH. In this way, the controller 40 changes the engine output torque line in response to the set target rotation speed.

The controller 40 calculates a target absorption torque of the hydraulic pump 25 in accordance with the target rotation speed of the engine 21. The target absorption torque is set so as to achieve a balance between the output horsepower of the engine 21 and the absorption horsepower of the hydraulic pump 25. The controller 40 calculates a target absorption torque on the basis of a pump absorption torque line as represented by Lp in FIG. 3. The pump absorption torque line defines the relationship between the engine rotation speed and the absorption torque of the hydraulic pump 25 and is stored in the storage unit 42 in the controller 40.

The controller 40 also selects the engine output torque line in response to a set work mode. The work mode is set using the input device 43. The work mode includes a P mode and an E mode.

The P mode is a work mode having a large output torque of the engine 21 and demonstrates superior workability. A first engine output torque line P1 depicted in FIG. 3 is selected in the P mode. The first engine output torque line P1 corresponds to, for example, a regulated or a maximum power output of the engine 21.

The E mode is a work mode having an output torque smaller than that of the P mode of the engine 21 and demonstrates superior fuel consumption. A second engine output torque line E1 depicted in FIG. 3 is selected in the E mode. The output torque of the engine 21 according to the second engine output torque line E1 is smaller than that of the first engine output torque line P1.

The operator is able to select a plurality of control modes in the above-mentioned P mode in the work vehicle 100 according to the present exemplary embodiment. The plurality of control modes includes a first control mode and a second control mode. The controller 40 controls the engine 21 according to the first engine output torque line P1 in the second control mode. The output of the hydraulic pump 25 is reduced as described below and the output torque of the engine is also reduced in accompaniment to the reduction of the output of the hydraulic pump 25 in the first control mode. That is, the output of the hydraulic pump 25 in the second control mode is larger than that of the first control mode.

Figure 4:
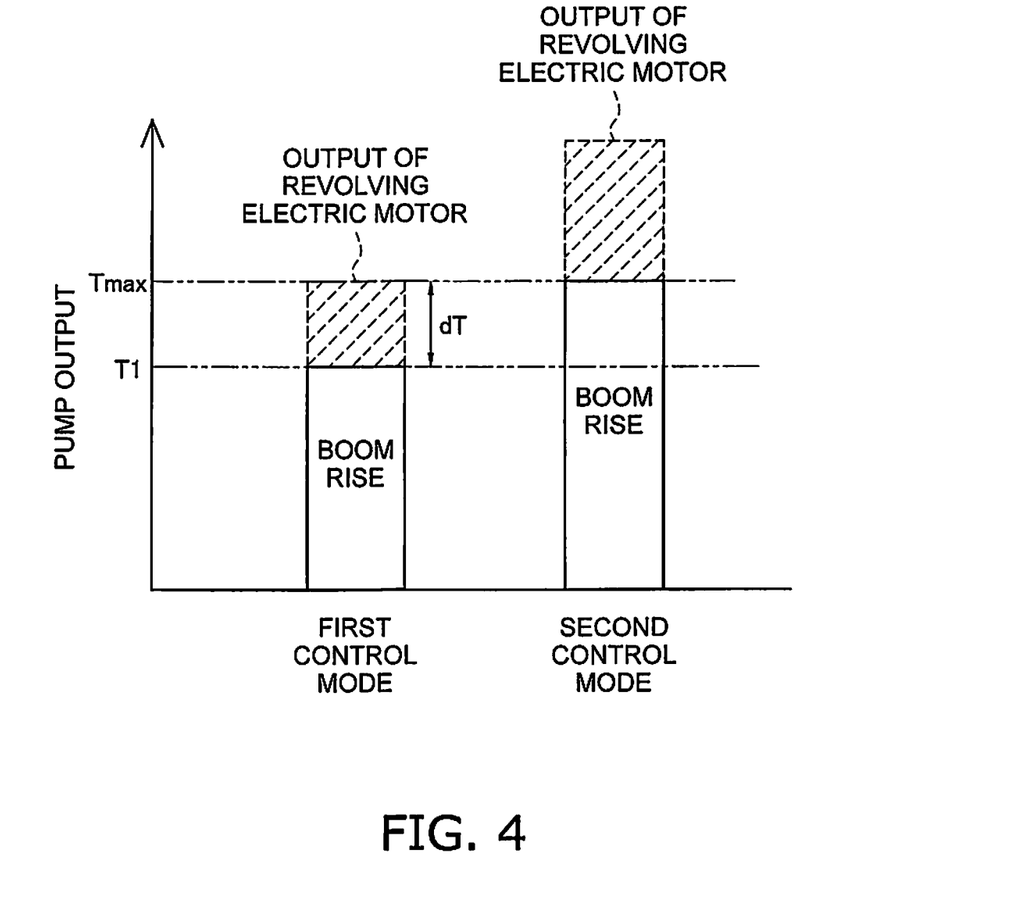
FIG. 4 illustrates the output of a hydraulic pump in a first control mode and a second control mode during a combined operation.
Figure 5:
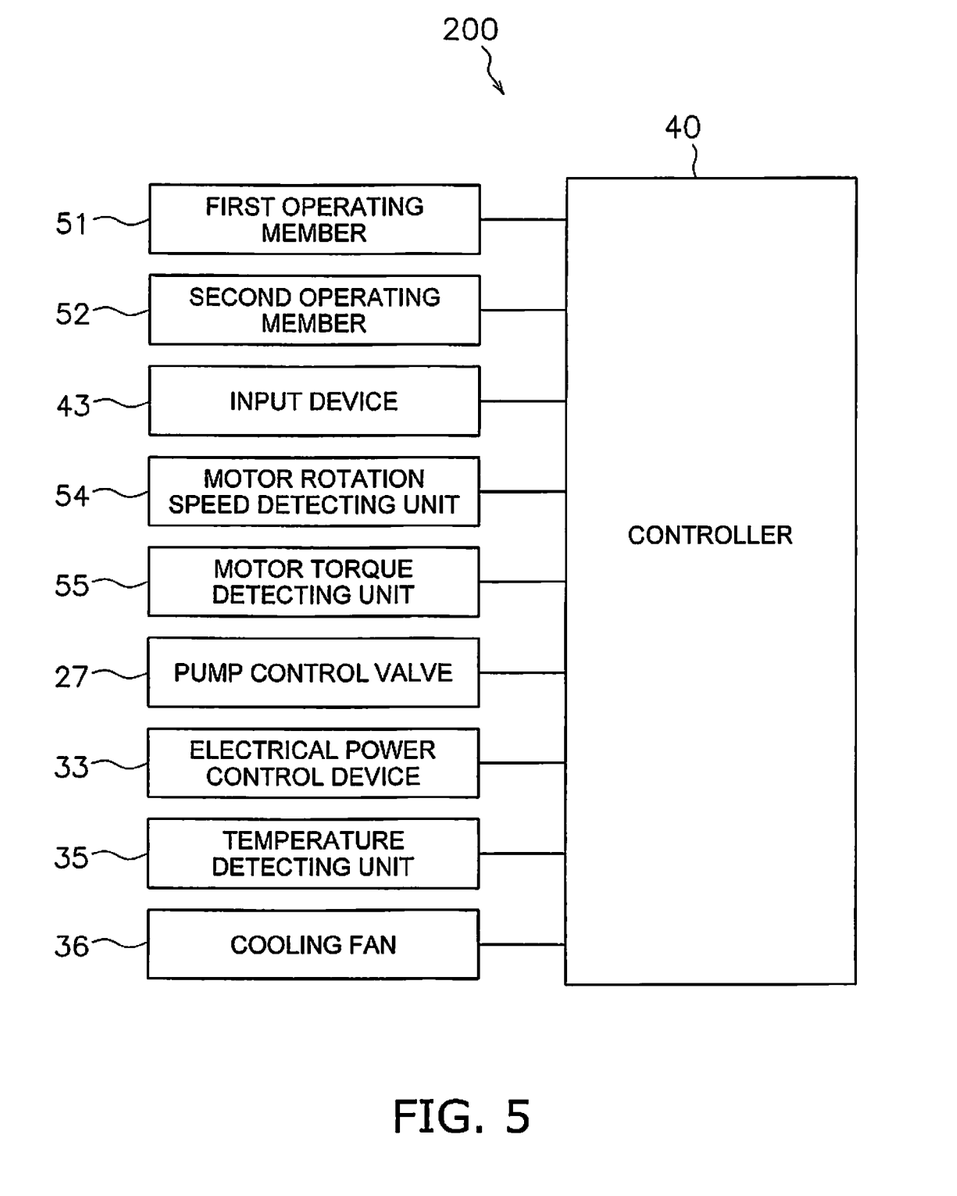
FIG. 5 is a block diagram of a control system of the work vehicle.

FIG. 4 illustrates the output of the hydraulic pump 25 in the first control mode and the second control mode during a combined operation. FIG. 5 illustrates a configuration of the control system 200 in the work vehicle 100. While the raising of the boom and the turning are exemplified as the combined operation in FIG. 4, the combined operation may be a combination of the operation of another hydraulic actuator and the turning operation.

Tmax in FIG. 4 is the maximum output of the hydraulic pump 25 determined according to the above-mentioned pump absorption torque. As illustrated in FIG. 4, the output of the hydraulic pump 25 in the first control mode is reduced to a value T1 which is smaller than the maximum output Tmax. A reduction amount dT thereof is determined on the basis of a revolving pump output which is derived by converting the output of the revolving electric motor 32 to the output of the hydraulic pump 25. Specifically the reduction amount dT is expressed by the following equation 1.

$$dT = Ls \times \alpha \qquad \text{Equation 1}$$

α represents a predetermined gain. In the first control mode, α is set to 1 or to a value close to 1. Ls represents the revolving pump output. The revolving pump output Ls is expressed by the following equation 2.

$$Ls = Nm \times Tm \times 1/\rho \qquad \text{Equation 2}$$

Nm represents the rotation speed of the revolving electric motor 32. The rotation speed Nm of the revolving electric motor 32 is detected by a motor rotation speed detecting unit 54 depicted in FIG. 2 and FIG. 5. The controller 40 receives a detection signal indicating the rotation speed Nm from the motor rotation speed detecting unit 54.

Tm represents the output torque of the revolving electric motor 32. The output torque Tm of the revolving electric motor 32 is detected by a motor torque detecting unit 55 depicted in FIG. 2 and FIG. 5. The controller 40 receives a detection signal indicating the output torque Tm of the revolving electric motor 32 from the motor torque detecting unit 55. ρ represents an efficiency incorporating hydraulic pressure loss and is set to a predetermined value.

As described above, the output of the hydraulic pump 25 in the first control mode is reduced to a value T1 which is smaller than the maximum output Tmax. The controller 40 outputs a command signal corresponding to the value T1 which is smaller than the maximum output Tmax as the output of the hydraulic pump 25.

As illustrated in FIG. 4, the output of the hydraulic pump 25 in the second control mode does not decrease as in the first control mode and the maximum output Tmax is set as the output of the hydraulic pump 25. That is, during the combined operation, the output of the hydraulic pump 25 in the second control mode is larger than that of the first control mode by an amount corresponding to the reduction amount dT. The boom cylinder 10 is driven according to the maximum output Tmax in the second control mode.

Specifically, the output of the hydraulic pump 25 is determined in the second control mode according to the operation amounts of the first operating member 51 and the second operating member 52. The maximum output Tmax is the maximum value of the output of the hydraulic pump 25 determined in accordance with the operation amounts of the first operating member 51 and the second operating member 52. The controller 40 outputs a command signal corresponding to the Tmax as the output of the hydraulic pump 25 to the pump control valve 27.

When a single operation is performed in which the revolving electric motor 32 is not operated and only the boom cylinder 10 is operated, the maximum output Tmax is set as the maximum output of the hydraulic pump 25.

Figure 6:
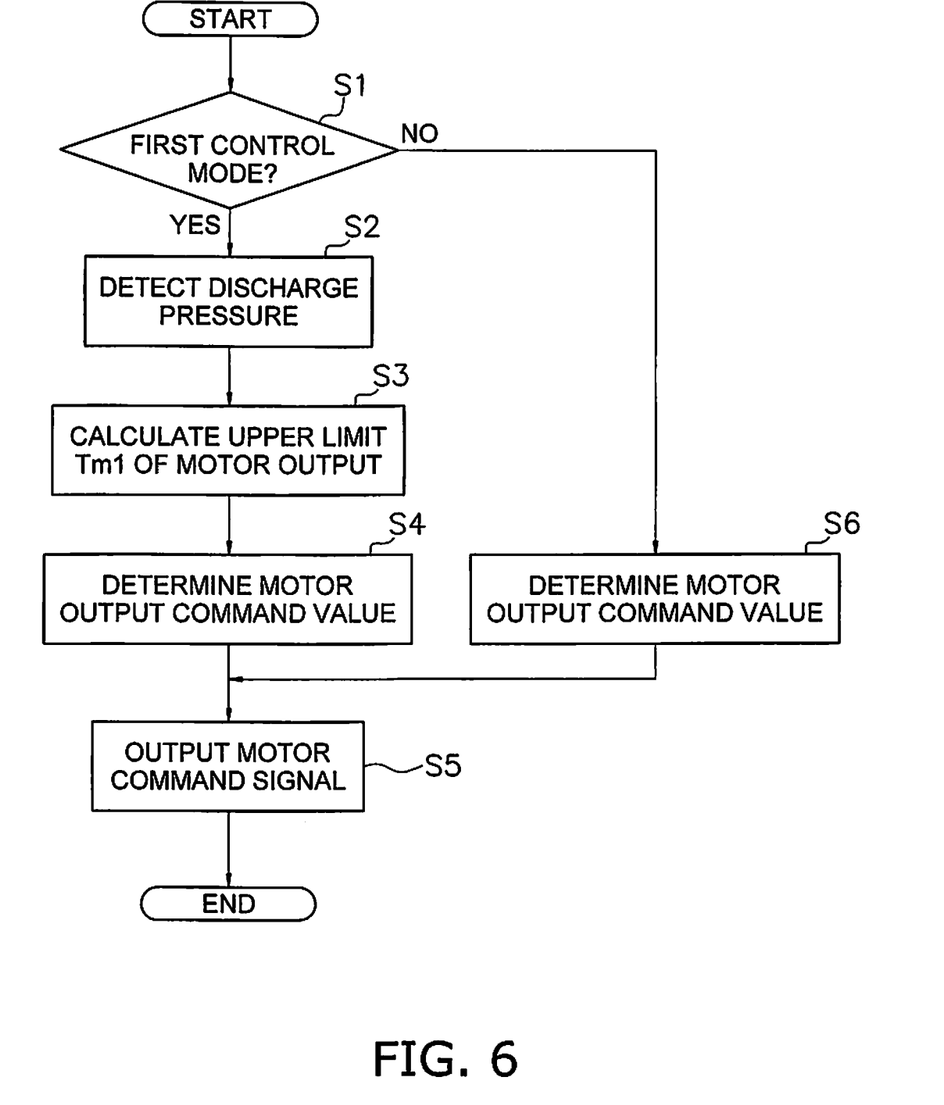
FIG. 6 is a flow chart illustrating control of a revolving electric motor.

The control of the revolving electric motor 32 in the first control mode and the second control mode will be discussed next. FIG. 6 is a flow chart illustrating control of the revolving electric motor 32.

A determination is made in step S1 as to whether the first control mode is selected. The operator is able to set the control mode to either the first control mode or the second control mode by operating the input device 43. The controller 40 receives a selection signal indicating the selected control mode from the input device 43 and sets the selected control mode as the control mode during the combined operation. The process advances to step S2 when the first control mode is selected in step S1. The process advances to step S6 when the first control mode is not selected, that is, of the second control mode is selected in step S1.

When the first control mode is selected in step S1, the limitation of the output of the revolving electric motor 32 is carried out in steps S2 to S4. Specifically, the discharge pressure of the hydraulic pump 25 is detected in step S2. The discharge pressure of the hydraulic pump 25 is detected by the discharge pressure detecting unit 39. The controller 40 receives a detection signal indicating the discharge pressure of the hydraulic pump 25.

An upper limit Tm1 of the motor output is calculated in step S3. The controller 40 determines the upper limit Tm1 of the motor output in accordance with the discharge pressure of the hydraulic pump 25. For example, the controller 40 reduces the upper limit Tm1 of the motor output in correspondence with a reduction in the discharge pressure of the hydraulic pump 25.

Next, the motor output command value is determined in step S4. The controller 40 determines, as the motor output command value, the smallest value between a motor output Tm2 determined in accordance with the operation amount of the first operating member 51 and the above-mentioned upper limit Tm1 of the motor output. That is, the controller 40 limits the output of the revolving electric motor 32 in accordance with the discharge pressure of the hydraulic pump 25 to a value not exceeding the upper limit Tm1 of the motor output in the first control mode.

In step S5, the controller 40 outputs the command signal corresponding to the motor output command value to the electrical power control device 33.

The output of the hydraulic pump 25 is distributed among a hydraulic motor and another hydraulic actuator in a conventional hydraulic revolving-type work vehicle in which the revolving body turns through the use of a hydraulic motor. The output of the hydraulic pump 25 that is distributed to the hydraulic motor is determined in accordance with the discharge pressure of the hydraulic pump 25. As a result, by determining the upper limit Tm1 of the motor output in the first control mode as described above, the output of the revolving electric motor 32 can be obtained that is the same as the output of the hydraulic pump 25 for turning in the hydraulic revolving-type work vehicle.

When the second control mode is selected in the step S1, the output of the revolving electric motor 32 is not limited as in steps S2 to S4. Therefore in step S6, the controller 40 determines the motor output Tm2, which is determined in accordance with the operation amount of the first operating member 51, as the motor output command value.

In step S5, the controller 40 then outputs the command signal corresponding to the motor output command value to the electrical power control device 33. As a result, the output of the revolving electric motor 32 in the second control mode which is equal to or greater than the output of the revolving electric motor 32 in the first control mode can be obtained as depicted by the dashed line in FIG. 4.

While the controller 40 does not limit the output of the revolving electric motor 32 in accordance with the discharge pressure of the hydraulic pump 25 in the second control mode, it does not mean to exclude limiting the output of the revolving electric motor 32 in accordance to the remaining electrical power amount in the electrical power storage device 34 or the like.

An overheat suppression control for suppressing overheating of the electrical drive system 20 will be discussed next. When the second control mode is selected by the operator, the output of the revolving electric motor 32 is not limited as mentioned above and the output of the revolving electric motor 32 is determined in accordance with the operation amount of the first operating member 51. However, the controller 40 monitors the temperature of the electrical drive system 20 and limits the output of the revolving electric motor 32 in response to the temperature of the electrical drive system 20. As a result, overheating of the electrical drive system 20 is suppressed.

In the following explanation, the limitation of the output of the revolving electric motor 32 according to the overheat suppression control is carried out when the output of the revolving electric motor 32 determined according to the second control mode is greater than the output of the revolving electric motor 32 determined according to the first control mode. That is, when the output of the revolving electric motor 32 determined in accordance with the operation amount of the first operating member 51 in the second control mode is equal to or less than the output of the revolving electric motor 32 determined according to the first control mode, the limitation of the output of the revolving electric motor 32 may not be carried out. In this case, the controller 40 may output a command signal indicating the output of the revolving electric motor 32 determined in accordance with the operation amount of the first operating member 51 to the electrical drive system 20.

Figure 7:
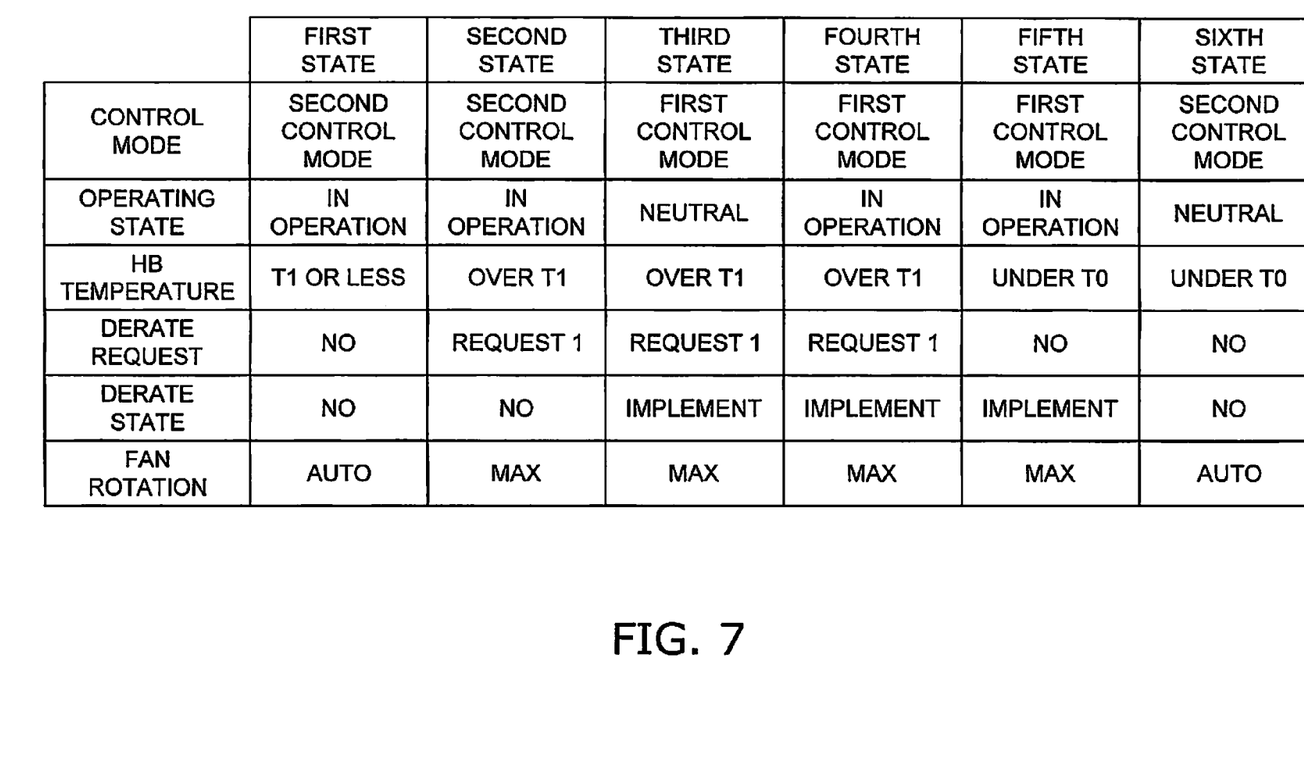
FIG. 7 illustrates relationships between the HB temperature and a derating request during overheat suppression control.

FIG. 7 is a state transition diagram during overheat suppression control. The control states of the work vehicle 100 transition from a first state to a sixth state in FIG. 7. A "control mode" in FIG. 7 indicates the control mode carried out by the controller 40. However, the control mode selected by the operator, that is, the control mode selected using the input device 43, is the second control mode.

When the "control mode" is the "second control mode," the controller 40 determines the motor output command value on the basis of the above-mentioned second control mode and outputs the command signal corresponding to the motor output command value to the electrical power control device 33. When the "control mode" is the "first control mode," the controller 40 determines the motor output command value on the basis of the above-mentioned first control mode and outputs the command signal corresponding to the motor output command value to the electrical power control device 33.

An "operating state" indicates the operating position of the first operating member 51 for operating the revolving body 3. The "operating state" being "in operation" signifies that the first operating member 51 is positioned in an operating position indicating turning to the right or turning to the left. The "operating state" being "neutral" signifies that the first operating member 51 is positioned in the neutral position.

An "HB temperature" signifies the temperature of the electrical drive system 20. As illustrated in FIGS. 2 and 5, the work vehicle 100 includes the temperature detecting unit 35 for detecting the temperature of the electrical drive system 20. The temperature detecting unit 35 detects the temperature of the electrical power control device 33.

In the present exemplary embodiment, the temperature detecting unit 35 is an ammeter for detecting the electric current value of elements, such as an insulated-gate bipolar transistor (IGBT) included in the electrical power control device 33. Because the temperature of the electrical power control device 33 changes in response to the electric current value of the elements of the electrical power control device 33, the temperature of the electrical power control device 33 can be detected by detecting the electric current value of an element in the electrical power control device 33. The temperature detecting unit 35 may be a thermistor and may directly detect the temperature of the electrical power control device 33. The controller 40 receives a signal indicating the FIB temperature from the temperature detecting unit 35.

A "derate request" indicates the level of a derate request determined by the controller 40. Herein, "derate" signifies the limitation of the output of the revolving electric motor 32. The levels of the derate request include "no," "request 1," and "request 2." FIG. 8 illustrates the relationship between the derate request and the HB temperature.

Figure 8:
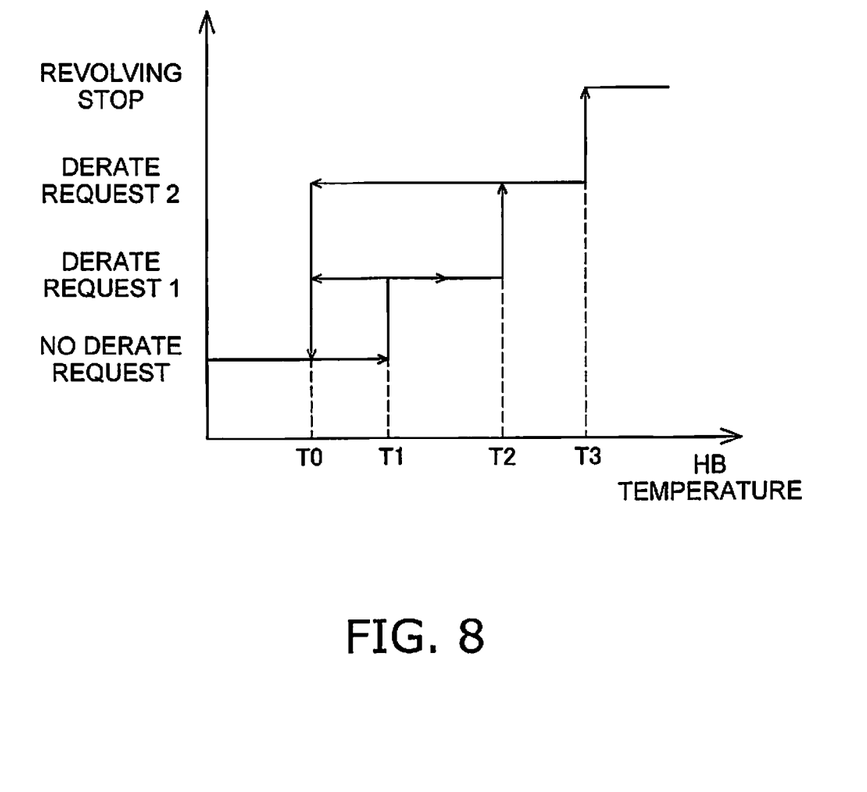
FIG. 8 is a state transition diagram during overheat suppression control.

As illustrated in FIG. 8, the controller 40 determines the derate request in accordance with the HB temperature. The controller 40 determines whether the HB temperature is greater than the first threshold T1. The controller 40 also determines whether the HB temperature is greater than the second threshold T2. The controller 40 determines that the derate request is "no" when the FIB temperature is equal to or less than the first threshold T1. The derate request being "No" signifies that the limitation of the output of the revolving electric motor 32 is not carried out.

The controller 40 determines that the derate request is "request 1" when the HB temperature is greater than the first threshold T1 and less or equal to the second threshold T2. The controller 40 determines that the derate request is "request 2" when the HB temperature is greater than the first threshold T2 and less or equal to a third threshold T3. The derate request being "request T1" or "request T2" signifies that the limitation of the output of the revolving electric motor 32 is carried out.

However, when the derate request is the "request 1," the limitation of the output of the revolving electric motor 32 is implemented when the first operating member 51 is returned to the neutral position without immediately implementing the limitation of the output of the revolving electric motor 32. Conversely when the derate request is the "request 2," the limitation of the output of the revolving electric motor 32 is implemented immediately regardless of the position of the first operating member 51.

When the HB temperature is greater than the third threshold T3, the controller 40 stops the revolving electric motor 32. That is, when the HB temperature is greater than the third threshold T3, the controller 40 stops the turning of the revolving body 3.

A "derate state" in FIG. 7 indicates whether the output limitation of the revolving electric motor 32 is implemented. The "derate state" being "no" signifies that the output limitation of the revolving electric motor 32 is not implemented. The "derate state" being "implement" signifies that the output limitation of the revolving electric motor 32 is being implemented.

The "fan rotation" indicates the state of the rotation control of a cooling fan 36. As illustrated in FIG. 5, the work vehicle 100 includes the cooling fan 36. The cooling fan 36 cools the electrical power control device 33 by generating cooling air that passes through the area around the electrical power control device 33.

When the "fan rotation" is "auto," the controller 40 controls the output of the cooling fan 36 in accordance with the temperature of the cooling water of the engine 21, the temperature of the hydraulic fluid, or the temperature of the electrical drive system 20. For example, the controller 40 outputs a command signal to the cooling fan 36 to increase the output of the cooling fan 36 in correspondence to an increase in the above temperatures.

The "fan rotation" being "max" indicates that the output of the cooling fan 36 is set at a predetermined maximum value regardless of the above-mentioned temperatures. As a result, the output of the cooling fan 36 is increased more when the "fan rotation" is "max" than when the "fan rotation" is "auto."

As illustrated in FIG. 7, the "operating state" in the first state is "in operation." Therefore, the revolving electric motor 32 is driven and the revolving body 3 turns in the first state. However, the HB temperature is equal to or less than the first threshold T1 in the first state. As illustrated in FIG. 8, the controller 40 determines that the derate request is "no" when the HB temperature is equal to or less than the first threshold T1. Therefore, the limitation of the output of the revolving electric motor 32 is not carried out. That is, the control mode in the first state is maintained at the second control mode as illustrated in FIG. 7. Moreover, the "fan rotation" is set to "auto."

Because the limitation of the output of the revolving electric motor 32 is not carried out in the first state, the HB temperature rises when the speed of the revolving body 3 increases. As illustrated in FIG. 8, the controller 40 determines that the derate request is "request 1" when the HB temperature is greater than the first threshold T1. However, when the derate request is the "Request 1," the controller 40 does not implement the derate request even when the HB temperature exceeds the first threshold T1 when the "operating state" is "in operation" as illustrated in the second state in FIG. 7. Therefore, the derate state is "no." That is, when the "operating state" is "in operation" even when the HB temperature exceeds the first threshold T1, the controller 40 maintains the control mode at the second control mode. However, the "fan rotation" is switched to "max" in the second state.

Next, when the "operating state" is returned to "neutral" while the derate request is the "request 1," the derate state becomes "implement" as illustrated in the third state in FIG. 7. That is, when the HB temperature is greater than the first threshold T1 and the "operating state" is "neutral," the control mode is switched from the second control mode to the first control mode. As a result, the limitation of the output of the revolving electric motor 32 is implemented as illustrated in FIG. 4. The "fan rotation" in the third state is maintained at "max."

Even when the "operating state" is switched from "neutral" to "in operation" while the derate request is the "request 1" and the derate state is "implement," the derate state is maintained at "implement" as illustrated by the fourth state in FIG. 7. That is, even when the HB temperature is greater than the first threshold T1 and the "operating state" is "in operation," the output limitation of the revolving electric motor 32 is maintained when the output limitation of the revolving electric motor 32 is being implemented. The "fan rotation" in the fourth state is maintained at "max."

As illustrated in FIG. 8, the controller 40 determines that the derate request is "none" when the HB temperature is lower than a release threshold T0 that is less than the first threshold T1 while limiting the output of the revolving electric motor 32.

However, when the "operating state" is "in operation" even when the HB temperature is less than the release threshold T0, the derate state is maintained at "implement" as illustrated in the fifth state in FIG. 7. That is, when the "operating state" is "in operation" even when the HB temperature is less than the release threshold T0, the controller 40 maintains the control mode at the first control mode and maintains the output limitation of the revolving electric motor 32. The "fan rotation" is maintained at "max" in the fifth state.

When the "operating state" is "neutral" while the HB temperature is less than the release threshold T0, the derate state is switched to "no" as illustrated in the sixth state in FIG. 7. That is, when the HB temperature is less than the release threshold T0 and the "operating state" is "neutral," the controller 40 switches the control mode from the first control mode to the second control mode and cancels the output limitation of the revolving electric motor 32. Further, the "fan rotation" is switched to "auto" in the sixth state.

When the HB temperature rises and exceeds the first threshold T1 in the work vehicle 100 according to the present exemplary embodiment as described above, the controller 40 switches the control mode from the second control mode to the first control mode. As a result, the output of the revolving electric motor 32 is limited and the revolving speed of the revolving body 3 is suppressed. Consequently, a rise in the HB temperature can be suppressed and the generation of overheating of the electrical drive system 20 can be suppressed.

For example, when the turning speed of the revolving body 3 is suppressed, the electrical power generated by the revolving electric motor 32 is suppressed. As a result, the generation of overheating due to an excessive amount of the regenerated electrical power is suppressed.

Alternatively, the electrical power inputted into the revolving electric motor 32 is suppressed by limiting the output of the revolving electric motor 32. As a result, the generation of overheating due to an excessive amount of the electrical power being inputted into the revolving electric motor 32 is suppressed.

Moreover, while the output of the revolving electric motor 32 is limited, the output of the revolving electric motor 32 is controlled in the first control mode. As a result, although the turning speed of the revolving body 3 is suppressed, work involving the turning of the revolving body 3 can be continued.

The controller 40 does not limit the output of the revolving electric motor 32 when the first operating member 51 is operated even when the HB temperature is higher than the first threshold T1. The controller 40 limits the output of the revolving electric motor 32 when the HB temperature exceeds the first threshold T1 and the first operating member 51 is in the neutral position. As a result, a change in the behavior of the revolving body 3, such as a sudden deceleration of the revolving body 3 during operation is suppressed. As a result, a sense of discomfort for the operator during operation can be suppressed.

The controller 40 limits the output of the revolving electric motor 32 when the HB temperature is higher than the second threshold T2 regardless of the position of the first operating member 51. As a result, a rise in the HB temperature can be promptly suppressed and the generation of overheating can be suppressed.

The controller 40 releases the limitation of the output of the revolving electric motor 32 when the HB temperature falls below the release threshold T0 while the output of the revolving electric motor 32 is being limited. In this case, the revolving body 3 can be turned quickly while suppressing the generation of overheating.

The controller 40 continues the limitation of the output of the revolving electric motor 32 when the first operating member 51 is being operated even when the HB temperature falls below the release threshold T0 while the output of the revolving electric motor 32 is being limited. The controller 40 releases the limitation of the output of the revolving electric motor 32 when the first operating member 51 is positioned in the neutral position and when the HB temperature falls below the release threshold T0 while the output of the revolving electric motor 32 is being limited. As a result, a change in the behavior of the revolving body 3 such as a sudden deceleration of the revolving body 3 during operation is suppressed. As a result, a sense of discomfort for the operator during operation can be suppressed.

The controller 40 increases the output of the cooling fan 36 when the HB temperature is higher than the first threshold T1. As a result, the generation of overheating can be suppressed by cooling the electrical drive system 20 using the cooling fan 36.

Although an exemplary embodiment of the present invention has been described so far, the present invention is not limited to the above exemplary embodiments and various modifications may be made within the scope of the invention.

The controller 40 is not limited to being provided in the work vehicle 100 and may be provided outside of the work vehicle 100. Alternatively, a portion of the functions of the above-mentioned controller 40 may be executed by an external device outside of the work vehicle 100.

The output of the hydraulic pump 25 is reduced more in the first control mode than in the second control mode in the above exemplary embodiment. However, the output of the hydraulic pump 25 may be controlled in the same way in the first control mode and the second control mode.

The output of the revolving electric motor 32 is limited by switching the control mode from the second control mode to the first control mode in the above exemplary embodiment. However, the output of the revolving electric motor 32 may be limited in the same control mode. For example, when the HB temperature exceeds the first threshold T1 in the second control mode, the output of the revolving electric motor 32 may be limited while maintaining the output of the hydraulic pump 25.

The control mode is not limited to the first control mode and the second control mode, and may include three or more control modes.

The temperature detecting unit 35 may not be limited to detecting the temperature of the electrical power control device 33 and may detect the temperature of another device in the electrical drive system 20. For example, the temperature detecting unit 35 may detect the temperature of the revolving electric motor 32.

The movable body is not limited to a revolving body and may be another member. For example, when the work implement is driven by an electric motor, the movable body may be a work implement.

According to exemplary embodiments of the present invention, continuous work is enabled while suppressing overheating of the electrical drive system in a work vehicle.

What is claimed is:

1. A control system for a work vehicle including a movable body and an electrical drive system including an electric motor for actuating the movable body, the control system comprising:
   a temperature detecting unit that detects a temperature of the electrical drive system; and
   a controller that limits an output of the electric motor when the temperature of the electrical drive system detected by the temperature detecting unit is higher than a first threshold and an operating member for the movable body is positioned in a neutral position;
   the controller not limiting the output of the electric motor when the operating member for the movable body is being operated even when the temperature of the electrical drive system exceeds the first threshold.

2. The control system for the work vehicle according to claim 1, wherein
   the controller limits the output of the electric motor when the temperature of the electrical drive system exceeds a second threshold that is higher than the first threshold regardless of a position of the operating member for the movable body.

3. The control system for the work vehicle according to claim 1, wherein
   the controller releases the limitation of the output of the electric motor when the temperature of the electrical drive system falls below a release threshold that is lower than the first threshold during the limitation of the output of the electric motor.

4. The control system for the work vehicle according to claim 3, wherein
   the controller continues the limitation of the output of the electric motor when the operating member for the movable body is being operated even when the temperature of the electrical drive system falls below the release threshold during the limitation of the output of the electric motor, and the controller releases the limitation of the output of the electric motor when the temperature of the electrical drive system falls below the release threshold and the operating member for the movable body is positioned in the neutral position during the limitation of the output of the electric motor.

5. The control system for the work vehicle according to claim 1, wherein the controller increases an output of a cooling fan for cooling the electrical drive system when the temperature of the electrical drive system exceeds the first threshold.

6. The control system for the work vehicle according to claim 1, wherein the controller is able to switch a control mode of the electric motor between at least a first control mode and a second control mode;

the controller limits the output of the electric motor to a smaller degree than the output corresponding to an operation amount of the operating member for the movable body in the first control mode;

the controller controls the output of the electric motor in accordance with the operation amount of the operating member for the movable body in the second control mode; and the controller switches the control mode of the electric motor from the second control mode to the first control mode when the temperature of the electrical drive system exceeds the first threshold while executing the second control mode.

7. The control system for the work vehicle according to claim 1, wherein the work vehicle includes a hydraulic pump and a work implement driven by hydraulic fluid discharged from the hydraulic pump, and the controller limits the output of the electric motor in accordance with a discharge pressure of the hydraulic pump in the first control mode.

8. The control system for the work vehicle according to claim 1, wherein the temperature detecting unit detects a temperature of the electric motor.

9. The control system for the work vehicle according to claim 1, wherein the electrical drive system includes an electrical power control device connected to the electric motor; and the temperature detecting unit detects a temperature of the electrical power control device.

10. A control method for a work vehicle including a movable body and an electrical drive system including an electric motor for actuating the movable body, the control method comprising:

a step for receiving a signal indicating a temperature of an electrical drive system;

a step for determining whether the temperature of the electrical drive system detected by a temperature detecting unit is higher than a predetermined first threshold; and a step for outputting a command signal to the electric motor to limit the output of the electric motor when the temperature of the electrical drive system detected by the temperature detecting unit exceeds the predetermined first threshold and an operation instruction of the movable body is not received;

the limitation of the output of the electric motor not being performed when the operation instruction of the movable body is received even when the temperature of the electrical drive system exceeds the first threshold.

11. A work vehicle comprising:

a movable body;

an electrical drive system including an electric motor that actuates the movable body; and a temperature detecting unit that detects a temperature of the electrical drive system;

an output of the electric motor being limited when the temperature of the electrical drive system detected by the temperature detecting unit exceeds a predetermined first threshold and an operating member for the movable body is positioned in a neutral position; and the limitation of the output of the electric motor not being performed when the operating member of the movable body is being operated even when the temperature of the electrical drive system exceeds the first threshold.

12. The work vehicle according to claim 11, wherein the electrical drive system includes an electrical power storage device that stores electrical power regenerated by the electric motor; and an electrical power control device connected to the electric motor and the electrical power storage device.

13. The control system for the work vehicle according to claim 2, wherein the controller releases the limitation of the output of the electric motor when the temperature of the electrical drive system falls below a release threshold that is lower than the first threshold during the limitation of the output of the electric motor.

14. The control system for the work vehicle according to claim 13, wherein the controller continues the limitation of the output of the electric motor when the operating member for the movable body is being operated even when the temperature of the electrical drive system falls below the release threshold during the limitation of the output of the electric motor, and the controller releases the limitation of the output of the electric motor when the temperature of the electrical drive system falls below the release threshold and the operating member for the movable body is positioned in the neutral position during the limitation of the output of the electric motor.

15. The control system for the work vehicle according to claim 14, wherein the controller increases an output of a cooling fan for cooling the electrical drive system when the temperature of the electrical drive system exceeds the first threshold.

16. The control system for the work vehicle according to claim 15, wherein the controller is able to switch a control mode of the electric motor between at least a first control mode and a second control mode;

the controller limits the output of the electric motor to a smaller degree than the output corresponding to an operation amount of the operating member for the movable body in the first control mode;

the controller controls the output of the electric motor in accordance with the operation amount of the operating member for the movable body in the second control mode; and the controller switches the control mode of the electric motor from the second control mode to the first control mode when the temperature of the electrical drive system exceeds the first threshold while executing the second control mode.

17. The control system for the work vehicle according to claim 16, wherein the work vehicle includes a hydraulic pump and a work implement driven by hydraulic fluid discharged from the hydraulic pump, and the controller limits the output of the electric motor in accordance with a discharge pressure of the hydraulic pump in the first control mode.

18. The control system for the work vehicle according to claim 17, wherein the temperature detecting unit detects a temperature of the electric motor.

19. The control system for the work vehicle according to claim 18, wherein the electrical drive system includes an electrical power control device connected to the electric motor; and the temperature detecting unit detects a temperature of the electrical power control device.

\* \* \* \* \*